(12) United States Patent
Westbrook

(10) Patent No.: US 7,079,246 B2
(45) Date of Patent: Jul. 18, 2006

(54) METHOD AND APPARATUS FOR MEASURING POLARIZATION

(75) Inventor: Paul Stephen Westbrook, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 356 days.

(21) Appl. No.: 10/413,962

(22) Filed: Apr. 15, 2003

(65) Prior Publication Data

US 2004/0207843 A1 Oct. 21, 2004

(51) Int. Cl.
*G01J 4/00* (2006.01)

(52) U.S. Cl. .................. 356/364; 356/367; 356/368; 356/369

(58) Field of Classification Search ............. 356/364, 356/365, 366, 367, 368, 369
See application file for complete search history.

(56) References Cited

U.S. PATENT DOCUMENTS

| | | | | |
|---|---|---|---|---|
| 4,053,232 A | * | 10/1977 | Dill et al. .................. | 356/369 |
| 5,757,494 A | * | 5/1998 | Green et al. ................ | 356/369 |
| 6,211,957 B1 | * | 4/2001 | Erdogan et al. ............ | 356/364 |
| 6,816,261 B1 | * | 11/2004 | Patel et al. ................. | 356/365 |
| 2003/0067602 A1 | * | 4/2003 | Patel et al. ................. | 356/369 |

* cited by examiner

*Primary Examiner*—Gregory J. Toatley, Jr.
*Assistant Examiner*—Roy M. Punnoose

(57) ABSTRACT

An improved method and apparatus for the measurement of the polarization of light uses nonlinear polarimetry. The higher order moments of the E field are measured and then transformed into standard polarimetry parameters yielding the polarization of the light. In a first embodiment, the light to be measured is transmitted through a rotating retarder. The retarder is optically coupled to a fixed analyzer and light is then detected by linear and nonlinear photodetectors. The spectra from the detectors is calculated and transformed, to obtain the polarization. In a second embodiment, the light to be measured is received by an optical fiber comprising a plurality of fiber birefringences to retard the light. Polarization sensitive gratings along the length of the fiber scatter the light, and photodetectors detect the scattered light. Apparatus in two preferred embodiments can perform the inventive method.

15 Claims, 2 Drawing Sheets

METHOD AND APPARATUS FOR MEASURING POLARIZATION

FIELD OF THE INVENTION

This invention relates to a method and apparatus for measuring the polarization of light.

BACKGROUND OF THE INVENTION

High-speed optical fiber communication systems operate by encoding information (data) onto lightwaves that typically propagate along optical fiber paths. Most systems, especially those used for medium to long distance transmission employ single mode fiber. As implied by the name, single mode fibers propagate only one mode of light below cutoff. The single mode typically includes many communications channels. The communications channels are combined into the one transmitted mode, as by wavelength division multiplexing (WDM) or dense wavelength division multiplexing (DWDM).

While only one mode is transmitted, that mode actually comprises two perpendicular (orthogonal) polarizations. The polarization of these two components varies undesirably as the waves propagate along a fiber transmission path. The distortion of the optical signals caused by the varying polarization is called polarization mode dispersion (PMD). PMD can be corrected through a combination of measurements of the PMD and the control of active corrective optics.

Polarimeters measure the polarization of light. Polarimeters can generate signals representing a measured degree of polarization that can be useful for diagnostic purposes. The signals can also be advantageously used for polarization correction using feedback techniques to minimize PMD.

Polarimeters generally employ one or more photodetectors and related electro-optical components to derive basic polarization data. The raw photodetector signal measurements are typically transformed by mathematical techniques into standard polarization parameters. In the prior art, the photodetector outputs are generally averaged, as by some electronic time constant, and then multiplied as part of the signal processing and transformation process. The problem with averaging at detection is that instantaneous temporal information lost through averaging cannot be retrieved later.

What is needed for more accurate polarization measurements is a polarimeter that instantaneously measures polarimeter photodetector outputs without averaging, multiplies the unaveraged signals early in signal processing, and then averages and transforms the signals into polarimetry parameters.

SUMMARY OF THE INVENTION

An improved method and apparatus for the measurement of the polarization of light uses nonlinear polarimetry. The higher order moments of the E field are measured and then transformed into standard polarimetry parameters yielding the polarization of the light. In a first embodiment, the light to be measured is transmitted through a rotating retarder capable of rotating at a plurality of angles with at least two retardances $\Delta$. The retarder is optically coupled to a fixed analyzer. The light from the analyzer is then detected by linear and nonlinear photodetectors. The spectra from the detectors is calculated and transformed, to obtain the polarization. In a second embodiment, the light to be measured is received by an optical fiber comprising a plurality of fiber birefringences to retard the light. Polarization sensitive gratings along the length of the fiber scatter the light, and photodetectors detect the scattered light. The signals from the photodetectors can then be transformed to obtain the polarization.

Apparatus in two preferred embodiments can perform the inventive method. In the first embodiment, nonlinear and linear photodetectors are preceded by a rotating retarder, rotating at a plurality of angles with a retardance, and an analyzer, such as a fixed polarizer. In the second preferred apparatus, a plurality of photodetectors are located adjacent to polarization sensitive gratings situated in a birefringent optical waveguide located between each of the polarization sensitive gratings.

DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DETAILED DESCRIPTION

This description is divided into two parts. Part I describes the inventive method for polarimetry and two embodiments for making polarization measurements according to the inventive method. For those skilled in the art, Part II further develops, defines, and introduces the concepts of invariance, state of polarization and degree of polarization, and the foundation equations governing nonlinear polarimetry as best understood by applicants at the time of the invention.

Part I: Nonlinear Polarimetry

Standard polarimeters use linear detectors and thus measure terms quadratic in the E field. These can be considered $2^{nd}$ order moments of the E field and are related to the power and the Stokes parameter of the E-field. A detector measuring intensity squared, though would measure $4^{th}$ order moments of the E field. Such higher order moments can have more information about the E-field. Simply put, a higher order moment of some time varying quantity is simply the time average of a higher power of the quantity. The first power is always just the mean. The second power is the standard deviation and so on.

Figure 1:
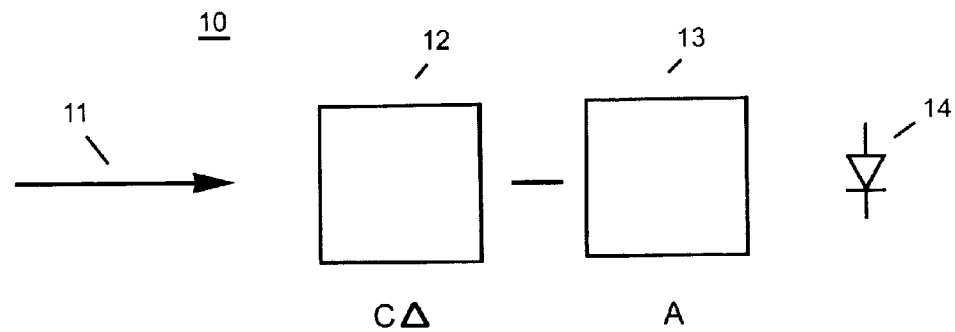
FIG. 1 shows an apparatus to perform the method of nonlinear polarimetry.

Nine moments of the E field can be measured with apparatus 10 as shown in FIG. 1. Incoming light 11 is retarded by retarder 12 at angle C, with a retardance of $\Delta$. Analyzer A 13 is a polarizer that precedes the nonlinear detector as represented by photodiode 14. This apparatus can be accomplished using bulk optics or integrated electro-optical techniques.

Retarder 12 is an optical component that retards one polarization with respect to the orthogonal polarization. In terms of E fields, the retarder gives one of the polarizations a phase with respect to the other orthogonal E component. Examples are ½ λ or ¼ λ retarders.

A ¼ λ wave retarders causes a $$\frac{\pi}{2}$$

delay difference:

$$\Delta = \left(\frac{\frac{1}{4}\lambda}{\lambda}\right)2\pi = \frac{\pi}{2}$$

Similarly, a ½ λ wave retarders causes a delay difference of π:

$$\Delta = \left(\frac{\frac{1}{2}\lambda}{\lambda}\right)2\pi = \pi$$

Here, the retarder 12 is a generic retarder. It has an arbitrary angle and arbitrary phase retardance. The angle C sets the two linear states of polarization on which the phase difference Δ is applied.

Analyzer 13 is a polarizer. It passes the light of polarization A, and suppresses all other polarizations. By rotating analyzer 13, light of polarization A is a continuous sampling of all 2π polarizations. A detector viewing the light output of a continuously rotating analyzer registers a periodic waveform. The Fourier spectra of that waveform contains a DC component (near 0), and all other components of the spectra.

A preferred alternative version of this embodiment rotates retarder 12, with a fixed analyzer 13 to generate the sin and cosine quadrature components of the Fourier spectra of the detector output. These components yield the nine E field higher order components.

The response of the nonlinear detector is:

$$V_{detector} = I_{optical}^2$$
$$= [|E_x|^2 + |E_y|^2]^2$$

A linear detector would measure:

$$I = \frac{1}{2}[S_0 + [S_1\cos 2C + S_2\sin 2C]\cos 2(A-C) +$$
$$[S_2\cos 2C - S_1\sin 2C]\sin 2(A-C)\cos\Delta +$$
$$S_3\sin 2(A-C)\sin\Delta]$$

The nonlinear detector would measure $I^2$, and the filter in the DC electronics would determine an averaging time, as in the linear case:

$$V_{detector} = \int_{T_{RC}} dt I^2 = \ldots \langle S_0 S_1 \rangle_{T_{RC}} \ldots$$

All nine components can be measured if one rotates both analyzer A and retarder C in a manner analogous to the linear Stokes case. By performing measurements at the different sum and difference frequencies proportional to nine linearly independent superpositions of $\langle S_i S_j \rangle$, a 9×9 inversion matrix may then be applied to calculate the nine moments.

For the nonlinear polarimeter one would toggle between:

$$A = \frac{\pi}{4} + \varepsilon_1, \Delta = \frac{\pi}{4} + \varepsilon_2, \text{ where } \varepsilon_1 \text{ and } \varepsilon_2 \text{ are small.}$$

and $$A = \frac{\pi}{4} \text{ and } \Delta = \frac{\pi}{4}$$

and rotate C at a fixed rate. Then the nine moments can be extracted from the nine (quadrature) components: 1 (DC), cos 2C, sin 2C, cos 4C, sin 4C, cos 6C, cos 8C, sin 8C. However, it can be advantageous to have more oscillating components, since it is less desirable to measure at a frequency that appears in the DC or non-oscillating response as this would be subject to DC noise.

Figure 2:
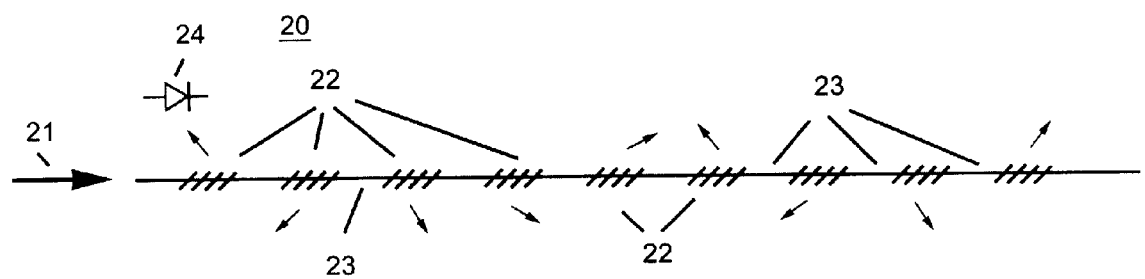
FIG. 2 shows an alternative apparatus to perform the method of nonlinear polarimetry using optical fiber and polarization sensitive gratings.

A static measurement of the moments can also be done with apparatus 20 as shown in FIG. 2, but with polarization sensitive gratings 22 and fiber birefringences 23 for the retarder. Here nonlinear detectors 24 detect the light scattered by polarization sensitive gratings 22. Birefringent optical fiber 23 causes the birefringences. In the limit of weak scattering for each grating, the scattered E-field is the same as in the case of the retarder and the analyzer. As before, there are nine detectors and a resultant 9×9 matrix to connect the detector values to the moments.

Here each grating with its nonlinear detector 24 will generate an output signal which is proportional to a linear transformation of the Stokes parameters. Each detector 24 signal is linearly related to a Stokes tensor component. Therefore with proper grating 22 alignments, the nine detector 24 outputs have a linear relationship with the nine Stokes tensor components. Gratings 22 are each aligned in different directions. Gratings 22 are each aligned azimuthally about the axis of the optical fiber. Both the grating 22 alignments and birefringences are aligned such that the 9×9 calibration matrix is invertible.

The measured moments have several uses. The degree of polarization (DOP) is most useful with the Stokes vector because it does not depend on the SOP. That is you can bump the fiber, and the DOP will not change. In other words, the DOP is invariant (see definition of invariant later in Part II) under unitary or lossless transformations. This makes it valuable as a monitoring quantity since a fiber bump does not change it, at least not as much as a bump causes a change in $S_1$ or $S_2$. The higher order moments also have invariants. To understand the invariance of $\langle S_i S_j \rangle$, remember that $\langle S_1 S_2 S_3 \rangle$ is a vector and unitary transformations correspond to a rotation on the Stokes sphere $R_{ij}$. With the higher order moments then, $(\langle S_0 S_1 \rangle, \langle S_0 S_2 \rangle, \langle S_0 S_3 \rangle)$ transforms as a vector. Therefore their magnitudes are fixed and:

$$\sum_{1}^{3} \langle S_0 S_i \rangle \langle S_0 S_i \rangle$$

is invariant.

But, there are more terms, since $\langle S_i S_j \rangle = T_{ij}$ is a tensor $$\sum_{i=1}^{3} \sum_{j=1}^{3} T_{ij} T_{ij}$$

is also invariant.

A proof of this is shown as follows (All duplicate indices are summed from 1 to 3):

Rotation of the stokes tensor:

$$T'_{ij} R_{im} R_{jn} = T_{mn},$$

invariant:

$$T_{ij} T_{ij} = T'_{ij} R_{im} R_{jn} T'_{kl} R_{km} R_{ln} = T'_{ij} T'_{kl} R_{im} R_{mk}^{-1} R_{jn} R_{nl}^{-1} =$$

$$R_{mk}^{-1} R_{nl}^{-1} \text{ (these are } 3 \times 3 \text{ rotation matrices)}$$

$$= \varepsilon_{ij} T'_{ij} T'_{ij}$$

Another invariant is:

$$\sum_{1}^{3} T_{ii} T_{ii},$$

and one can also get invariants from the determinants:

det($T_{ij}$), where i,j=1,2,3. Therefore a list of some invariants is:

$$\sum_{i,j=1}^{3} T_{ij}^2, \sum_{j=1}^{3} T_{0j}^2, \sum_{j=1}^{3} T_{jj}^2,$$

and det($T_{ij}$), where i,j=1,2,3. These invariants can all represent useful monitoring quantities. Since higher moments are usually most interesting when combined with the lower moments to give fluctuations of the E-field, it would be useful to build in the same linear measurement done in normal polarimetry.

Figure 3:
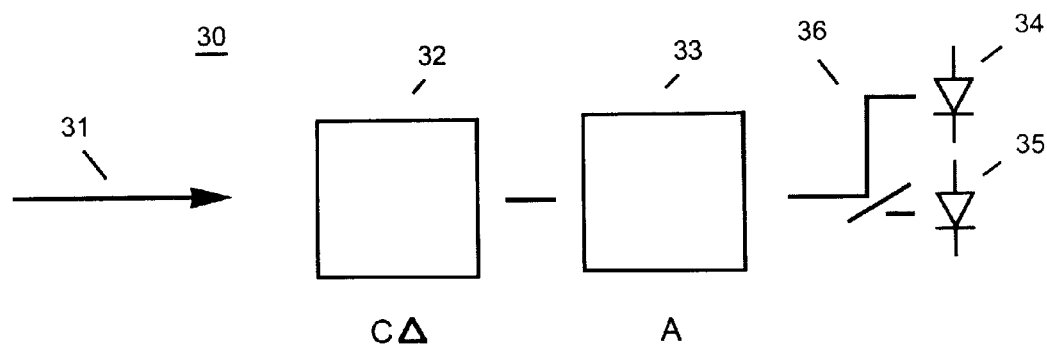
FIG. 3 shows an apparatus as in FIG. 1, including a linear and a nonlinear detector.

FIG. 3 shows an apparatus to accomplish this measurement comprising incoming light 31 retarded by retarder 32 at angle C, with retardance Δ. Analyzer A 33 comprises coupler 36, and nonlinear and linear photon detector 34 and 35. The response of detectors is $V_l = k_l I$ for detector 34, and $V_j = k_j I^2$ for detector 35. By building four more gratings into the device of FIG. 3, for a total of 13 gratings, the averages can be subtracted from higher order moments.

Using such an embodiment, one can measure $aV_l^2 - V_l$, where a is such that when the signal is constant, $aV_l^2 - V_n = 0$, then $V_n - aV_l^2 \geq 0$, since intensity fluctuations always make $\langle I^2 \rangle > \langle I \rangle^2$. DOP=0 gives the extreme case, since the linear detector is constant in this case.

Figure 4:
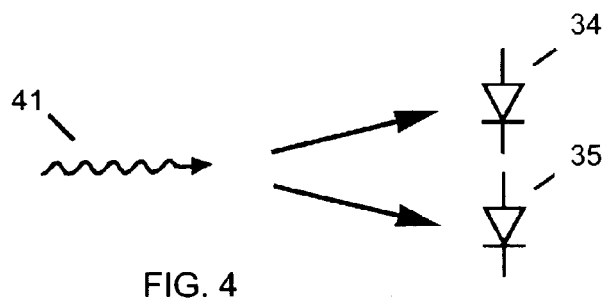
FIG. 4 shows a detector arrangement comprising a linear and a nonlinear detector.

An important advantage to having both a linear and nonlinear detector is that the nonlinear detector can be "nonlinearized" by subtracting out the linear part. This is illustrated by FIG. 4, where the response to light 41 of detector 34 is $V_l = CI$, and the response of detector 35 is $V_n = aI^2 + bI$. Thus:

$$V_{nonlinear \atop quadratic} = cV_n - bV_l \alpha \alpha cI^2$$

This would allow for lower powers to be used with the nonlinear detector. Of course the noise would still be as large as it is for one detector, but one could extend the nonlinear concept previously discussed and measure the linear and nonlinear moments simultaneously. This embodiment of the invention needs nine nonlinear (quadratic) and four linear detectors. The 13 detectors would have a linear relationship to the 13 linear and quadratic moments as related by a 13×13 matrix. Rotating polarizers or static birefringence can be used.

EXAMPLES

Figure 5:
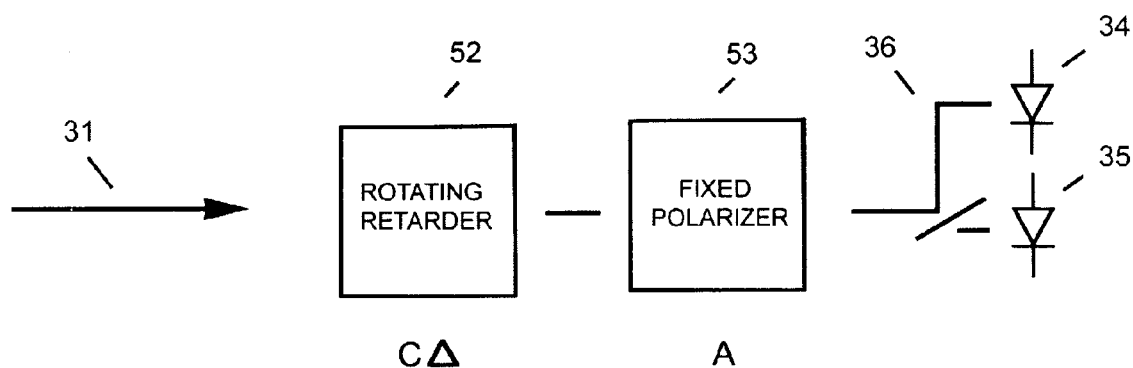
FIG. 5 shows a first preferred embodiment of an apparatus to perform the method of nonlinear polarimetry.

FIG. 5 shows a first preferred embodiment of the nonlinear polarimeter. Here, rotating retarder 52 receives light 31, fixed polarizer 53 is optically coupled to rotating retarder 52 and coupler 36. Coupler 36 splits the light from fixed polarizer 53 to the two photodetectors, linear detector 34 and nonlinear detector 35. This embodiment can be accomplished in bulk optics or by using integrated electro-optics fabrication techniques.

Figure 6:
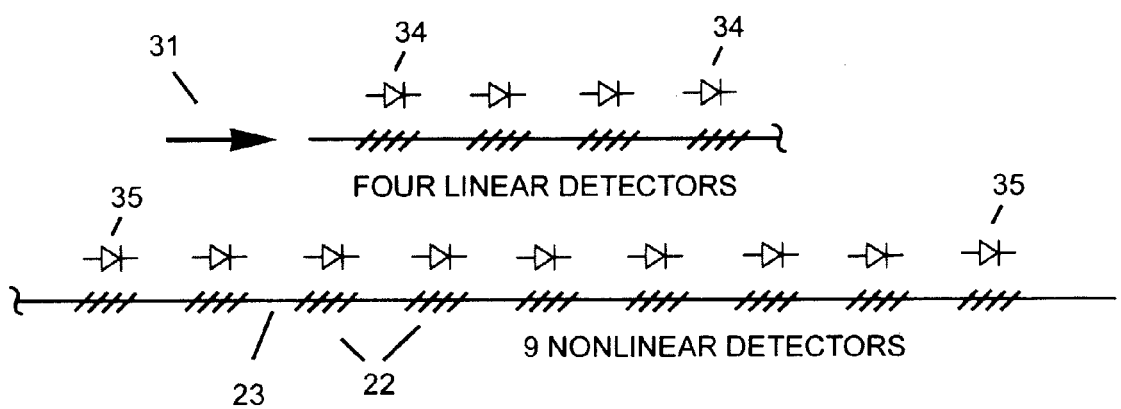
FIG. 6 shows a second preferred optical fiber apparatus to perform the method of nonlinear polarimetry.

FIG. 6 shows a second preferred embodiment of a nonlinear polarimeter to accomplish static measurement of the moments. Here, fiber 23 receives light 31. The light from polarization sensitive gratings 22 is detected by four linear detectors 34 and nine nonlinear detectors 35. Each polarization sensitive gratings 22 has a different scattering angle. Birefringent optical fiber 23 causes the birefringences. In the limit of weak scattering for each grating, the scattered E-field is the same as in the case of specific retarder and the analyzer positions. As before, there are nine detectors and a resultant 9×9 matrix to connect the detector values to the moments. This embodiment can be fabricated with optical fibers and fiber components or by integrated electro-optic fabrication techniques. Here the additional four detector outputs yield a 13×13 calibration matrix. The polarization sensitive gratings' 22 scattering angles and the sections of birefringent optical fiber 23 are set such that the 13×13 calibration matrix is invertible.

Actual fabrication forms and techniques suitable for constructing the inventive apparatus in general, includes, but is not limited to, bulk optical components, optical fibers and optical fiber components, and integrated techniques, including planer waveguides, and other integrated optical components.

Part II: Theoretical Development of Nonlinear Polarimetry Including the Definition of Invariance Invariance: A polarization transformation is said to be invariant when there is a polarization transformation in which the two principle states are delayed by less than the coherence length of the light. This is an invariant transformation. In mathematical terms:

$\int dt E_1(t) E_2(t+\tau_c) \neq 0$, $\tau_c$=correlation time, $E_1, E_2$ are principal states, and $\tau_{invariant} \ll \tau_c$. In short: Invariant=unitary with $\tau < \tau_c$ where $\tau$ is the maximum time delay between polarization components. Also the ratio of the two principle states must remain fixed, i.e., the "fiber touch" cannot be before a large PMD element such as a fiber link, since changing the launch polarization into a fiber with PMD will change the ratio of the two principle states and hence alter the output pulse shape and its higher order moments. The "fiber touch" that we wish to avoid being sensitive to through the use of invariants is that directly before the polarization monitor. With standard polarimeters the only invariants are the total power and the DOP.

State of polarization and Degree of Polarization: It is useful to provide a clear definition of "state of polarization" (or SOP), with respect to an optical signal propagating through a fiber. In general, if the core-cladding index difference in a given optical fiber is sufficiently small, then the transverse dependence of the electric field associated with a particular mode in the fiber may be written as:

$$E(z,t) = \hat{x} A_x \exp(i\phi_x) + \hat{y} A_y \exp(i\phi_y)$$

where $A_x$ and $A_y$ define the relative magnitude of each vector component and the phases are defined as follows:

$$\phi_x = \beta z - \omega t + \phi_0, \text{ and}$$

$$\phi_y = \beta z - \omega t + \phi_0 - \delta,$$

where $\beta$ defines the propagation constant, $\omega$ defines the angular frequency, $\phi_0$ defines an arbitrary phase value, and $\delta$ is the relative phase difference between the two orthogonal components of the electric field.

In accordance with the teachings of the present invention, the state of polarization (SOP) of an optical fiber will be described using the Jones calculus and the Stokes parameters, since these are both complete and commonly used. In terms of equation (1), the Jones vector J that describes the field at any location z or point in time t is given by the following:

$$J = (A_x \exp(i\phi_x), A_y \exp(i\phi_y)) = \exp(i\phi_x)(A_x, A_y \exp(-i\delta)).$$

In practice, the factor $\exp(i\phi_x)$ is ignored, so that the state of polarization is described by the three main parameters: $A_x$, $A_y$ and $\delta$. The physical interpretation of these three parameters is most commonly based on the polarization ellipse, which describes the path traced out by the tip of the electric field vector in time at a particular location, or in space at a particular time. It should be noted that the Jones vector description is valid only for monochromatic light, or a single frequency component of a signal.

A more complete description of the state of polarization is based on the defined Stokes parameters, since this method also accounts for the degree of polarization (DOP) of a non-monochromatic signal. In terms of the Jones vector parameters, the four Stokes parameters are defined by:

$$S_0 = A_x^2 + A_y^2$$

$$S_1 = A_x^2 - A_y^2$$

$$S_2 = 2 A_x A_y \cos \delta$$

$$S_3 = 2 A_x A_y \sin \delta,$$

and the degree of polarization (DOP), $0 \leq DOP \leq 1$, is defined to be:

$$DOP = \frac{\sqrt{S_1^2 + S_2^2 + S_3^2}}{S_0}.$$

A partially polarized signal can be considered to be made up of an unpolarized component and a polarized component. The DOP is used to define that fraction of the signal which is polarized, and this fraction may be described by either the polarization ellipse or Jones vector. It is to be noted that, in strict terms, there are four parameters that fully describe the elliptical signal: (1) the shape of the ellipse; (2) the size of the ellipse; (3) the orientation of the major axis; and (4) the sense of rotation of the ellipse. Thus, four measurements can unambiguously define the signal. These four parameters are often taken to be $A_x$, $A_y$, the magnitude of $\delta$, and the sign of $\delta$. The four Stokes parameters also provide a complete description of fully as well as partially polarized light. The Jones vector may be derived from the Stokes parameters according to:

$$A_x = \sqrt{S_0 + S_1}/\sqrt{2}$$

$$A_y = \sqrt{S_0 - S_1}/\sqrt{2}$$

$$\delta = \arctan(S_3/S_2)$$

It is to be noted that the last equation above does not unambiguously determine $\delta$. Most numerical implementations of $\theta = \arctan(x)$ define the resulting angle such that $-\pi/2 < \theta < \pi/2$. Thus, for $S_2 \geq 0$, the expression $\delta = \arctan(S_3/S_2)$ should be used, where as for $S_2 < 0$, the expression $\delta = \arctan(S_3/S_2) \pm \pi$ should be used. Therefore, with the knowledge of the four Stokes parameters, it is possible to fully determine the properties of the polarized signal.

It has been recognized in accordance with the teachings of the present invention that the full state of polarization (SOP) cannot be determined by merely evaluating the signal passing through a single polarizer. Birefringence alone has also been found to be insufficient. In particular, a polarimeter may be based on a presumption that the optical signal to be analyzed is passed through a compensator (birefringent) plate of relative phase difference $\Gamma$ with its "fast" axis oriented at an angle C relative to the x axis (with the light propagating along the z direction). Further, it is presumed that the light is subsequently passed through an analyzer with its transmitting axis oriented at an angle A relative to the x axis. Then, it can be shown that the intensity I of the light reaching a detector disposed behind the compensator and analyzer can be represented by:

$$I(A,C,\Gamma) = \tfrac{1}{2}\{S_0 + S_1[\cos(2C)\cos(2[A-C]) - \sin(2C)\sin(2[A-C])\cos(\Gamma)] + S_2[\sin(2C)\cos(2[A-C]) + \cos(2C)\sin(2[A-C])\cos(\Gamma)] + S_3\sin(2[A-C])\sin(\Gamma)\}.$$

In this case, $S_j$ are the Stokes parameters of the light incident on the compensator, such that $S_0$ is the incident intensity. If the compensator is a quarter-wave plate ($\Gamma = \pi/2$), then the intensity as defined above can be reduced to:

$$I(A,C,\pi/2) = \tfrac{1}{2}\{S_0 + [S_1\cos(2C) + S_2\sin(2C)]\cos(2[A-C]) + S_3\sin(2[A-B])\},$$

Whereas if the compensator is removed altogether (Γ=0), the equation for the intensity I reduces to:

$$I(A,-,0)=\tfrac{1}{2}\{S_0+S_1\cos(2A)+S_2\sin(2A)\}.$$

This latter relation illustrates conclusively that it is impossible, without introducing birefringence, to determine the value of $S_3$, and hence the sense of rotation of the polarization ellipse.

Following from the equations as outlined above, a polarimeter may be formed using a compensator (for example, a quarter-wave plate), a polarizer, and a detector. In particular, the following four measurements, used in conventional polarimeters, unambiguously characterize the Stokes parameters:

1) no wave plate; no polarizer→I(-,-,0)=$S_0$
2) no wave plate; linear polarizer along x axis→I(0,-,0)= ½($S_0+S_1$)
3) no wave plate; linear polarizer at 45°→I(45,-,0)= ½($S_0+S_2$)
4) quarter-wave plate at 0°; linear polarizer at 45°→I(45, 0,π2)=½($S_0+S_3$).

In a conventional polarimeter using this set of equations, the measurements may be performed sequentially with a single compensator, polarizer and detector. Alternatively, the measurements may be performed simultaneously, using multiple components by splitting the incoming beam of light into four paths in a polarization-independent fashion.

Nonlinear Polarimeters:

Standard polarimeters measure the degree of polarization (DOP), or Stokes parameters that represent the polarization, by taking time averaged measurements of the x and y components of the E-field as represented by:

$$S_1=\langle E_xE_x^*\rangle-\langle E_yE_y^*\rangle$$

But, higher order moments can be measured as well as:

$$\langle E_xE_x^*E_xE_x^*\rangle \text{ or } \langle E_yE_y^*E_yE_y^*\rangle$$

A nonlinear polarimeter is a device that measures the higher order moments. These measurements can provide extra information about the bit stream or any polarized or partially polarized signal.

The number of moments that can be measured can be determined in two ways. The E-field representation as mentioned above is one way:

Define (m,n) where m=#$E_x$'s and n=#$E_y$'s

This gives 1×(4,0)+1×(0,4)+2(1,3)+2(3,1)+3(2,2)=9 or
$\langle E_xE_x^*E_xE_x^*\rangle$ $\langle E_yE_y^*E_yE_y^*\rangle$ $\langle E_xE_x^*E_yE_y^*\rangle$ $\langle E_yE_x^*E_yE_y^*\rangle$ $\langle E_xE_x^*E_xE_y^*\rangle$ $\langle E_xE_x^*E_yE_x^*\rangle$ $\langle E_xE_y^*E_xE_y^*\rangle$ $\langle E_yE_x^*E_yE_x^*\rangle$ $\langle E_xE_x^*E_yE_y^*\rangle$ Alternatively, the un-averaged Stokes products $S_iS_j$ can be constructed. These are the $2^{nd}$ order moments before averaging:

$$S_0S_1=(E_xE_x^*+E_yE_y^*)(E_xE_x^*-E_yE_y^*)$$

They are linear superpositions of the four product E field averages. The independent quantities are: $S_0S_1, S_0S_2, S_0S_3, S_1S_1, S_2S_2, S_3S_3, S_1S_2, S_2S_3S_3S_1$. Again there are nine higher order moments. Note that these are not the same as Stokes parameters:

$$\langle S_1S_2\rangle\neq\langle S_1\rangle\langle S_2\rangle$$

Also, $S_0S_0$ is not independent, because before averaging DOP=1, therefore, before time averaging, $S_0S_0=S_1S_1+S_2S_2+S_3S_3$.

What is claimed:

1. A nonlinear polarimeter comprising:
  a retarder configured to rotate and to impose a phase delay on a first polarization of an optical signal with respect to a second polarization of the optical signal to produce an intermediate optical signal;
  an analyzer configured to receive the intermediate optical signal and to suppress a polarization of the intermediate optical signal; and
  a photodetector, configured to receive the intermediate optical signal having a suppressed polarization, and configured to be responsive to a nonlinear optical process.

2. The polarimeter of claim 1 wherein the photodetector is configured to be responsive to both a linear and a nonlinear optical process.

3. The polarimeter of claim 2 wherein the photodetector comprises photodiodes.

4. The polarimeter of claim 1 wherein the retarder has variable angle with retardance.

5. The polarimeter of claim 1 wherein the retarder is fixed and the analyzer is configured to rotate.

6. A nonlinear polarimeter comprising:
  an optical waveguide with a plurality of birefringent sections configured to impose a phase delay on a first polarization of an optical signal with respect to a second polarization of the optical signal;
  a plurality of polarization sensitive gratings between the birefringent sections to scatter a polarization of the optical signal; and
  a plurality of photodetectors, including at least one photodetector configured to be responsive to a nonlinear optical process, the at least one photodetector configured to be optically coupled to at least one grating.

7. The polarimeter of claim 6 wherein the optical waveguide is a fiber waveguide.

8. The polarimeter of claim 6 wherein the optical waveguide is a planer waveguide.

9. The polarimeter of claim 6 fabricated as an integrated optical structure.

10. The polarimeter of claim 6 wherein there are nine polarization sensitive gratings and nine corresponding photodetectors, each being configured to be responsive to a nonlinear optical process, the photodetectors aligned to result in an invertible 9×9 calibration matrix.

11. The polarimeter of claim 6 wherein each photodetector output is linearly related to a Stokes tensor.

12. The polarimeter of claim 6 wherein the plurality of photodetectors comprises photodetectors responsive to linear optical processes and photodetectors responsive to nonlinear optical processes.

13. The polarimeter of claim 7 wherein there are 13 polarization sensitive gratings and nine corresponding detectors configured to be responsive to a nonlinear optical process and four detectors configured to be responsive to a linear optical process, the birefringences and gratings aligned to result in an invertible 13×13 calibration matrix.

14. The polarimeter of claim 6 wherein the photodetectors are photodiodes.

15. The polarimeter of claim 6 wherein the polarization sensitive gratings and the birefringent sections are aligned to result in an invertible calibration matrix.

* * * * *